US008726354B2

(12) United States Patent
Vlasov et al.

(10) Patent No.: US 8,726,354 B2
(45) Date of Patent: May 13, 2014

(54) SYSTEM AND METHOD FOR PERFORMING ACCESS CONTROL

(75) Inventors: Iulian Vlasov, Mississauga (CA); Punipriya Misri, Mississauga (CA); Dev Doongoor, Toronto (CA); Mee Tchin Jane John Chuan, Richmond Hill (CA)

(73) Assignee: Blackberry Limited, Waterloo (CA)

( * ) Notice: Subject to any disclaimer, the term of this patent is extended or adjusted under 35 U.S.C. 154(b) by 260 days.

(21) Appl. No.: 13/183,947

(22) Filed: Jul. 15, 2011

(65) Prior Publication Data

US 2012/0042362 A1 Feb. 16, 2012

Related U.S. Application Data

(60) Provisional application No. 61/364,914, filed on Jul. 16, 2010.

(51) Int. Cl.
*G06F 15/16* (2006.01)
(52) U.S. Cl.
USPC .......................... 726/4; 726/2; 726/3; 726/21
(58) Field of Classification Search
USPC ............................................................ 726/4
See application file for complete search history.

(56) References Cited

U.S. PATENT DOCUMENTS 6,202,066 B1 * 3/2001 Barkley et al. ................ 707/785
6,453,353 B1 9/2002 Win et al.
7,984,066 B1 7/2011 Kilday et al.
2003/0037263 A1 2/2003 Kamat et al.
2005/0086126 A1 * 4/2005 Patterson ........................ 705/26
2008/0256458 A1 * 10/2008 Aldred et al. ................. 715/741

FOREIGN PATENT DOCUMENTS

GB 2430280 A 3/2007
WO WO 03/015342 A1 2/2003

OTHER PUBLICATIONS

Reeder, R. et al.; "Expandable Grids for Visualizing and Authoring Computer Security Policies"; Proceedings of the 26th Annual CHI Conference on Human Factors in Computing Systems, Florence, Italy, 2008; pp. 1473 to 1482; ISBN: 978-1-60-558011-1.
Reeder, R.; "Expandable Grids: A user interface visualization technique and a policy semantics to support fast, accurate security and privacy policy authoring"; Jul. 2008; pp. 61 to 74; These retrieved from http://reports-archive.adm.cs.cmu.edu/anon/anon/usr/ftp/2008/CMU-CS-08-143.pdf Oct. 14, 2011.

(Continued)

*Primary Examiner* — Edward Zee
*Assistant Examiner* — Baotran N To
(74) *Attorney, Agent, or Firm* — Brett J. Slaney; Blake Cassels & Graydon LLP

(57) ABSTRACT

Rather than defining roles in terms of those resources and/or actions pertaining to the resources that are permitted to subjects having that role, it has been found that by instead defining a role by negative permissions, i.e. those resources and/or actions related thereto that are not permitted to subjects in that role, the evolution of a system is more convenient to manage. In this way, the system is only required to track and update the denied resources for particular roles. It has also been recognized that by defining a role in terms of negative permissions, i.e. what subjects in that role cannot do, malicious users can be thwarted from creating false user accounts since selecting functions associated with the resources takes permissions away rather than adds them.

18 Claims, 18 Drawing Sheets

(56) References Cited

OTHER PUBLICATIONS

Moyer, M. et al.; "Generalized Role-Based Access Control"; Proceedings of the 21$^{st}$ International Conference on Distributed Computing Systems, Jan. 2001; pp. 391 to 398; ISBN: 978-0-76-951077-4.

Emig, C.; et al.; "An Access Control Metamodel for Web Service-Oriented Architecture"; International Conference on Software Engineering Advances (ICSEA 2007); 2007; IEEE; ISBN: 978-0-7695-2937-0.

Schafer, A.; Search Report from corresponding European Application No. 11174127.8; search completed Oct. 14, 2011.

* cited by examiner

You do not have sufficient permissions to view this page.

Please click the Back button on your browser to try again.

FIG. 11

Support Staff Details

Please type the information in the following fields.

Name: Mr. Hacker's Child    User ID: hacker-offspring
Email: prv@hack.com    Password: ●●●●●●●●●    'password' is the default password
Language: English    Title: Support Staff Manager Determine the rights associated to this profile. When finished, click Submit

Services

☑ Assign Services        ☑ Suspend Services      ☑ Bulk Processing          ☑ Manage Service Access Control
☑ Resume Services        ☑ Deactivate Services   ☑ Activate Services        ☑ Remove Support Staff

Account Services

☑ Manage Value Added Resellers              ☑ Change Passwords
☑ Modify Support Staff                      ☐ Reset Password
☑ Manage Value Added Resellers Subscribers  ☑ Create Support Staff

[ Submit ] [ Cancel ]

FIG. 15

Support Staff Details

Please type the information in the following fields.

Name: Rim Support   User ID: rimsupport
Email: aaa@rim.net   Password:
Language: English ▼   Title: RIM Support ▼  — 202

Select the permissions that you want to deny. When finished, click Submit.

Services
☐ Bulk Processing   ☑ Deactivate Services   ☐ Activate Services

Service Groups Management
☐ Activate Non billable services   ☐ Manage Non billable services   ☐ View Non billable services

Account Services
☐ Manage Service Access Control   ☐ Modify Support Staff   ☐ Reset Password
☐ Remove Support Staff   ☐ Create Support Staff   ☐ Change Passwords

Wireless Device Software Upgrades
☑ Rollback OTASL Upgrades   ☑ Initiate OTASL Upgrades   ☑ Monitor OTASL Upgrades
☑ Administer Default OTASL Configuration

[Submit] [Cancel]

Support Staff Details

Please type the information in the following fields.

Name: Rim Admin  User ID: rimadmin

Email: aaa@rim.net  Password:

Language: English  Title: RIM_Administrator

Submit  Cancel

SYSTEM AND METHOD FOR PERFORMING ACCESS CONTROL

This application claims priority from U.S. Application No. 61/364,914 filed on Jul. 16, 2010, the contents of which are incorporated herein by reference.

TECHNICAL FIELD

The following relates to systems and methods for performing access control.

BACKGROUND

In computer system security, access control is often used as an approach to restrict system access to authorized users. Role-based access control is a particular approach wherein, within an organization, roles are created for various functions. The permissions to perform certain operations are assigned to specific roles. Users or other entities or "subjects" are assigned particular roles, and through those role assignments acquire the permissions to perform particular system functions. Since the subjects are not assigned permissions directly, but only acquire them through their role (or roles), management of individual rights becomes a matter of assigning appropriate roles to the subject rather than individual permissions for each and every subject.

BRIEF DESCRIPTION OF THE DRAWINGS

Embodiments will now be described by way of example only with reference to the appended drawings wherein:

FIG. 11 is a screen shot of an example error message.

FIG. 15 is a screen shot of an example user interface for creating a user account using positive permissions.

FIG. 16 is a screen shot of an example user interface for creating a user account using negative permissions.

FIG. 17 is a screen shot of an example user interface for a user to edit their own account.

DETAILED DESCRIPTION OF THE DRAWINGS

Role-based access control systems that define a set of permissions for each role, typically include in the set of permissions, those interactions with a controlled or restricted environment that are permissible to any subject given that role. Although this enables roles to be updated and added rather than modifying or defining permissions on a subject-by-subject basis, it has been found that systems typically evolve over time and, in particular, when new features are added that are to be made available to several roles, each role needs to be updated with the additional permission. In systems with many roles, the addition of such permissions or, similarly, the modification of existing permissions (that relate to multiple roles), can be burdensome.

Rather than defining roles in terms of those resources and/or actions pertaining to the resources that are permitted to subjects having that role, it has been found that by instead defining a role by negative permissions, i.e. those resources and/or actions related thereto that are not permitted to subjects in that role, the evolution of a system is more convenient to manage. For example, if a new resource is added to a system or a minor system-wide modification is made to add an action to an existing resource, the resource and/or action may be added to the system and the role definitions and the roles only require updating if particular ones are denied that resource. In this way, the system is only required to track and update the denied resources for particular roles.

It has also been recognized that by defining a role in terms of negative permissions, i.e. what subjects in that role cannot do, malicious users can be thwarted from creating false user accounts since selecting functions associated with the resources will take permissions away rather than add them.

For the purposes of the following examples, a "resource" may refer to any data, object, item, etc. that is provided by or otherwise available within a particular environment which is being restricted or controlled. For example, a resource may be a data file such as an electronic document. Associated with each resource is at least one action, which may generally refer to any operation, function, or other ability to access or modify a resource. For example, various menu options may correspond to actions that can be applied to a data file, e.g. view, edit, delete, copy, etc. A permission (P) may refer to an action, pertaining to a particular resource, which is permitted. Conversely, a denial (D) may refer to an action, pertaining to a particular resource, which is not permitted. A subject may refer to any user or other entity (e.g. virtual user, server, other system, etc.) that is attempting to access the environment to perform an action pertaining to a particular resource.

Figure 1:
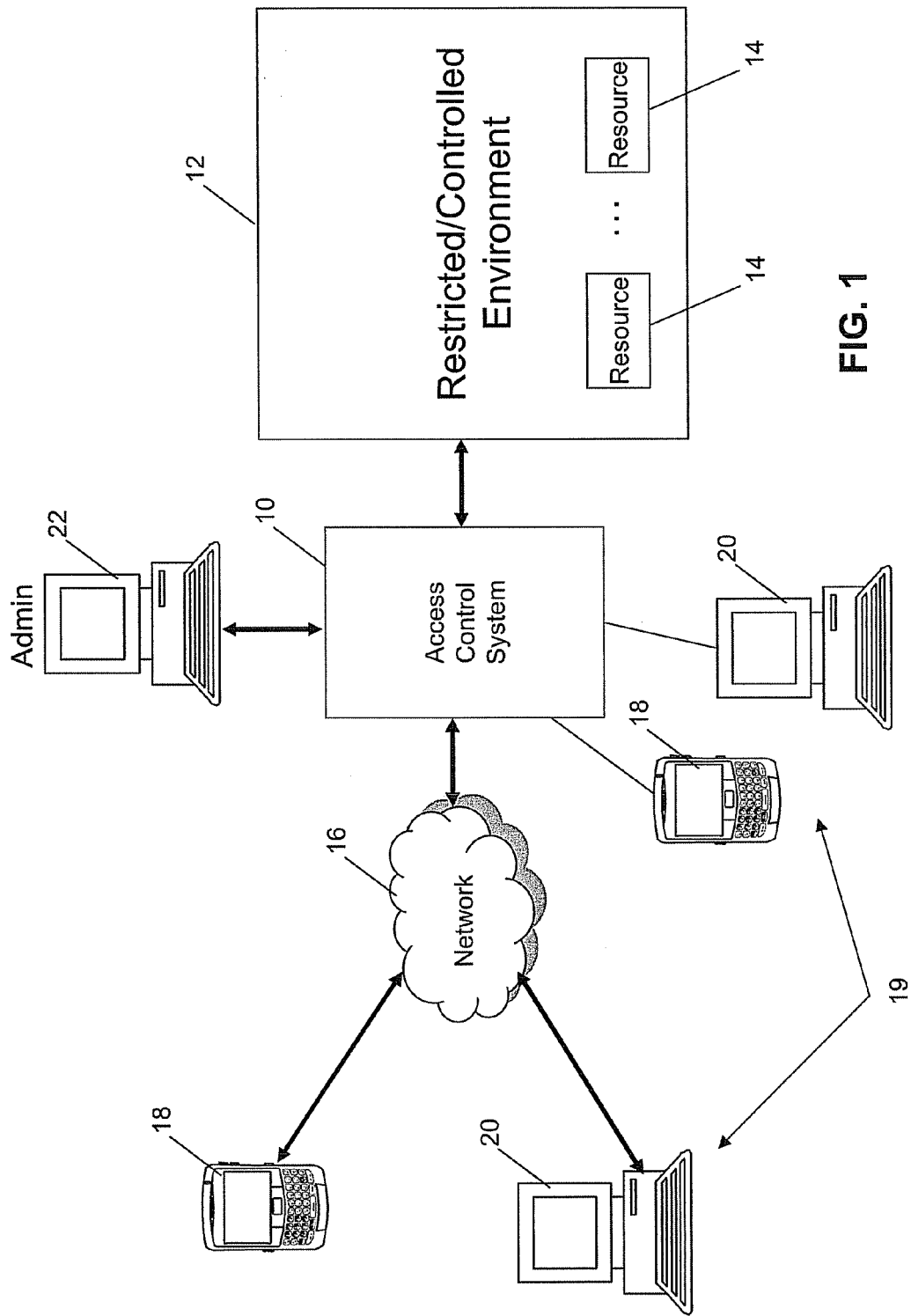
FIG. 1 is a block diagram of an access control system being used to restrict or control access to resources in an environment.

Turning now to FIG. 1, an access control system 10 is shown, which is incorporated into or interposed between a restricted or controlled environment 12 (the "environment 12" hereinafter) and one or more subjects 19, for controlling access to one or more resources 14 considered to be part of, or within, the environment 12. In this example, the access control system 10 provides access control to subjects 19 that connect via a network 16 such as a local area network (LAN), the Internet, etc., as well as those that may connect thereto directly. Also shown in this example are both mobile communication devices 18 and other computing or communication devices such as a desktop computer 20. The access control system 10 may be controlled or otherwise managed by an administrator 22.

Figure 2:
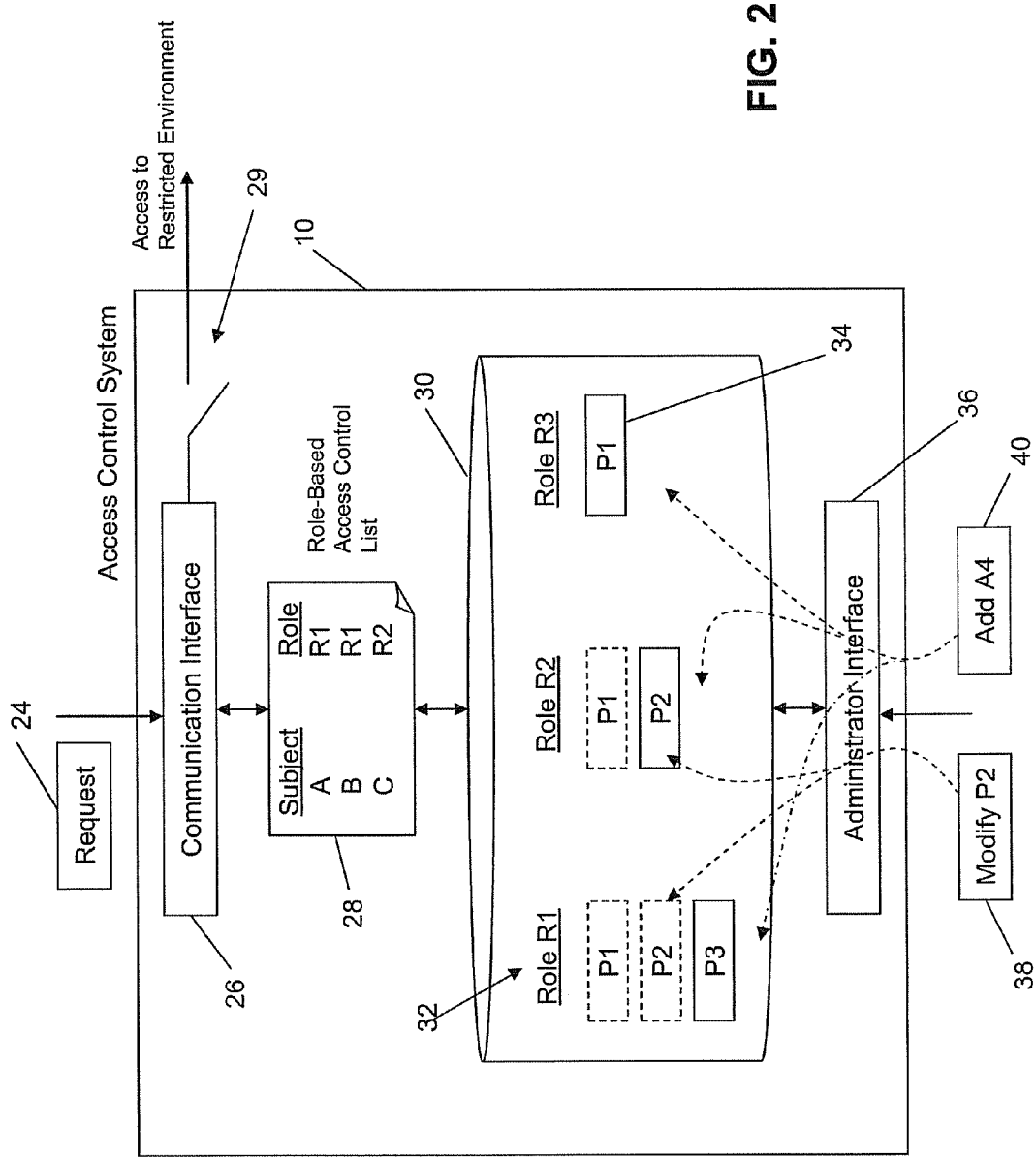
FIG. 2 is a block diagram of a role-based access control system based on positive access permissions.

FIG. 2 illustrates an example role-based access control system 10 that utilizes positive access permissions 34 (P1, P2, etc.) to define which resources 14 in the environment 12 a subject 19 associated with a particular role 32 may access. In this example configuration, a request 24 to access a particular resource 14 can be received or otherwise obtained using a communication interface 26. The communication interface 26 is configured to reference an access control list 28 to determine if an access grant 29 is permitted for the subject 19, based on the subject's role 32 and the permissions 34 associated with that role 32. The access control list 28 comprises a mapping of registered subjects to one or more roles 32. Although each subject 19 in FIG. 2 is associated with one role 32, it can be appreciated that a subject 19 may be associated with more than one role 32.

The access control list 28 can be used to determined which roles 32 are associated with the subject 19 making the request (i.e. the requestor). Once the role(s) 32 is/are determined, the access control list 28 may reference, or the access control system 10 itself may reference, a role definition database 30. The role definition database 30 comprises, for each role 32, one or more permissions 34 indicating which resources 14 that particular role is entitled to access in the environment 12 for performing one or more particular actions. In this way, by referencing a particular role 32 in the database 32, the access control system 10 can determine if the requested action can be accessed by the requesting subject 19.

FIG. 2 illustrates certain ones of the permissions in dashed lines to indicate that the roles 32 may form part of a hierarchy. In this example, R3 provides a base role 32 with permission P1. R2 may then extend from R3 to inherit P1 and add a further permission P2. Similarly, in this example, R1 may then extend from R2 to inherit both P1 and P2 (through the inheritance of R3 in R2) and add a further permission P3. It can be appreciated that FIG. 2 provides only one illustrative example of a simple hierarchical structure wherein R1 has more permissions than R2, which has more permissions than R3. In other hierarchies (discussed later), the hierarchy may represent a logical mapping between what is permitted if a particular permission is inherited etc. and thus the hierarchy need not represent an organizational importance structure.

As discussed, in order to add or modify permissions, an administrator 22 via an administrator interface 36 in the example of FIG. 2 (using positive permissions P), would need to update each role 32 in the database 32 that is affected by the modification or addition or at least examine the effect of inheritances on the modifications. For example, although in FIG. 2 the modification would only be needed in R2 since only R1 inherits P2, more complex hierarchies would typically having multiple instances of the same permission. In other embodiments however, wherein a hierarchical inheritances are not used, a modification 38 to P2 would amount to an update to both R1 and R2. Similarly, an addition 40 that adds a new action 14, A4, which in this example is accessible to all roles 32, would require each role 32 to be updated, e.g. to provide a permission associate with an action related to A4, i.e. P4. Even if a hierarchical structure is used, the administrator interface 36 would need to determine, given the hierarchy, which role 32 P4 could be placed to thereby propagate through to each role 32 that should have permission to perform that particular action associated with A4.

Figure 3:
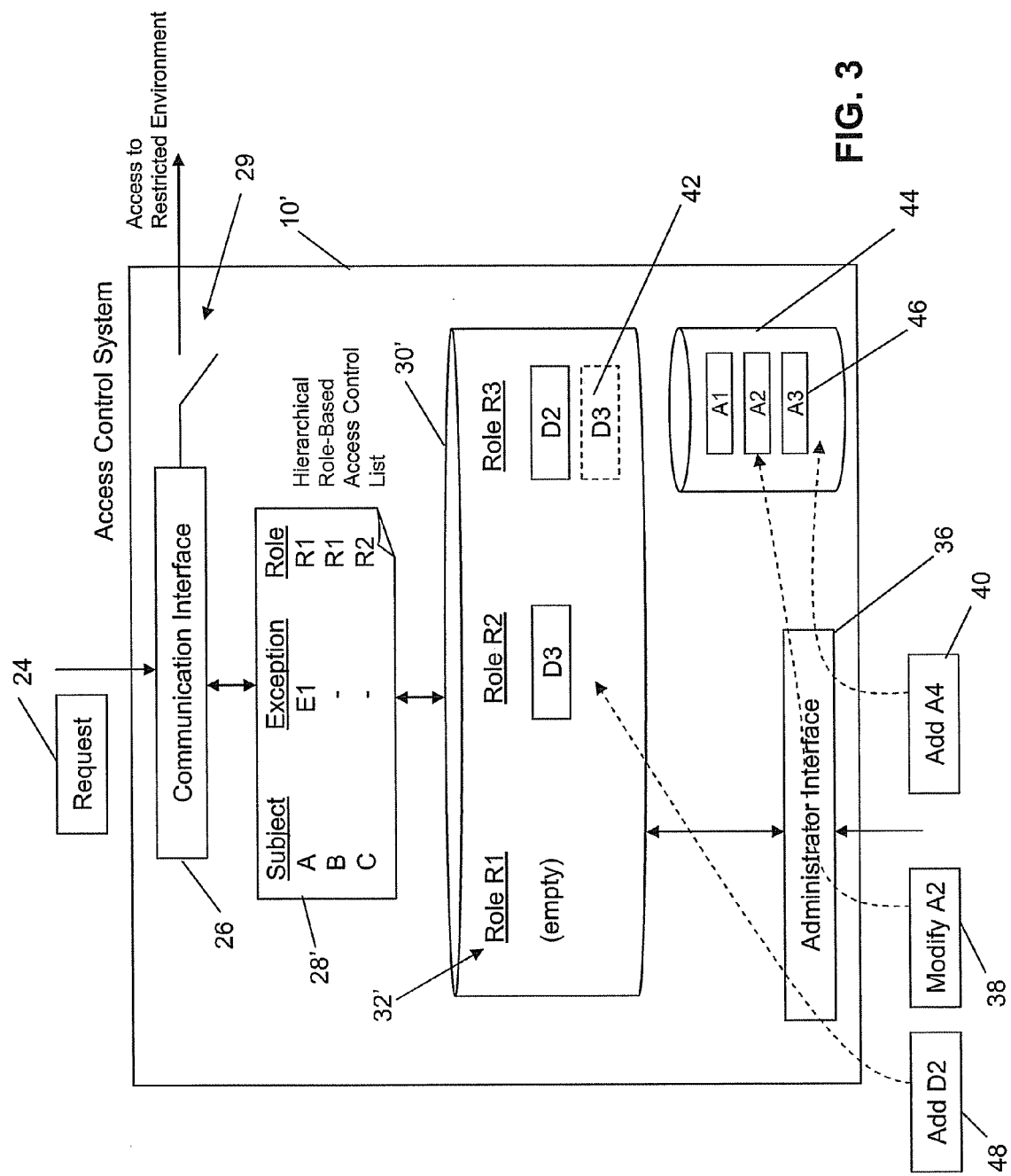
FIG. 3 is a block diagram of a role-based access control system based on negative access permissions.

To more conveniently mange changes to the roles 32, FIG. 3 illustrates a example configuration for the access control system 10', wherein the suffix (') indicates a component from FIG. 2 that is modified. Turning now to FIG. 3, the communication interface 26 and administrator interface 36 may comprise a configuration similar to that shown in FIG. 2. However, in FIG. 3, a negative access, hierarchical, permission based, role definition database 30' is utilized, wherein each role 32' has associated therewith, one or more denials 42 indicative of an action (A) related to a resource 14 that subjects 19 associated with that role 32' cannot perform (including accessing, modifying, deleting, copying, etc.). An action database 44 is also shown for illustrative purposes, which lists the actions 46 related to resources 14 in the environment 12 that are subject to access control. It can be appreciated that a set of denials 42 in the database 30' for a particular role 32' implies that the complement of this set corresponds to actions 46 that may be accessed by subjects 19 having that role 32'. In other words, the complement of a set of denials 42 corresponds to any action 46 in the action database 44 that is not associated with a denial 42 in that set.

By providing access control on the basis of negative access permissions (i.e. by listing denials 42), a new action addition 40 (e.g. new action for an existing resource 14 or new resource with at least one new action—e.g. view resource) simply updates the action database 44 with A4 in this example, thereby indicating that unless specified as a denial 42 in the database 32', a subject 19 may perform that action 46. Similarly, any modification 38 to, for example, A2 (e.g. protocol, format to be used, etc.), would need to be done in only the action database 44 without requiring each role 32' to be modified or the hierarchy examined to ensure correct propagation. Only denial additions 48 would require the database 30' to be updated, however, only those roles 32' that are to be given such a negative permission need to be modified, which would be specified when the addition is being made.

It can be appreciated that FIG. 3 illustrates the negative of the permissions in FIG. 2. In other words, R1 may perform any action and thus has no denials 42, R2 is only denied action A3 (and thus lists denial D3), and R3 is denied both A2 and A3 and thus lists denials D2 and D3. The roles 32' in FIG. 3 may also be hierarchically related. In this way, R2 extends from R1 to inherent zero denials 42 from R1 (empty set) but add new denial D3. R3 would then inherit the denial 42 from R2 and add an additional denial 42, namely D2. D3 is thus shown in dashed lines in FIG. 3 to illustrate that D3 would not necessarily need to be specified twice if R3 extends from R2.

The access control list 28' in FIG. 3 also includes an "Exception" column, which can be used to assign subject-specific exceptions to particular subjects 19. For example, although Subject A is given role R1, a particular denial (e.g. D6—not shown) can be added that would not be associated with all subjects 19 having R1 but to that particular subject 19, i.e. Subject A in this example. When providing exceptions as shown in FIG. 3, these subject-based restrictions would be checked before examining what is permitted within the associated role 32'. In this way, if that subject 19 is denied a particular action, there is no reason to examine the role's denials as the subject-based exception would supersede what is defined in the role 32'.

Figure 4:
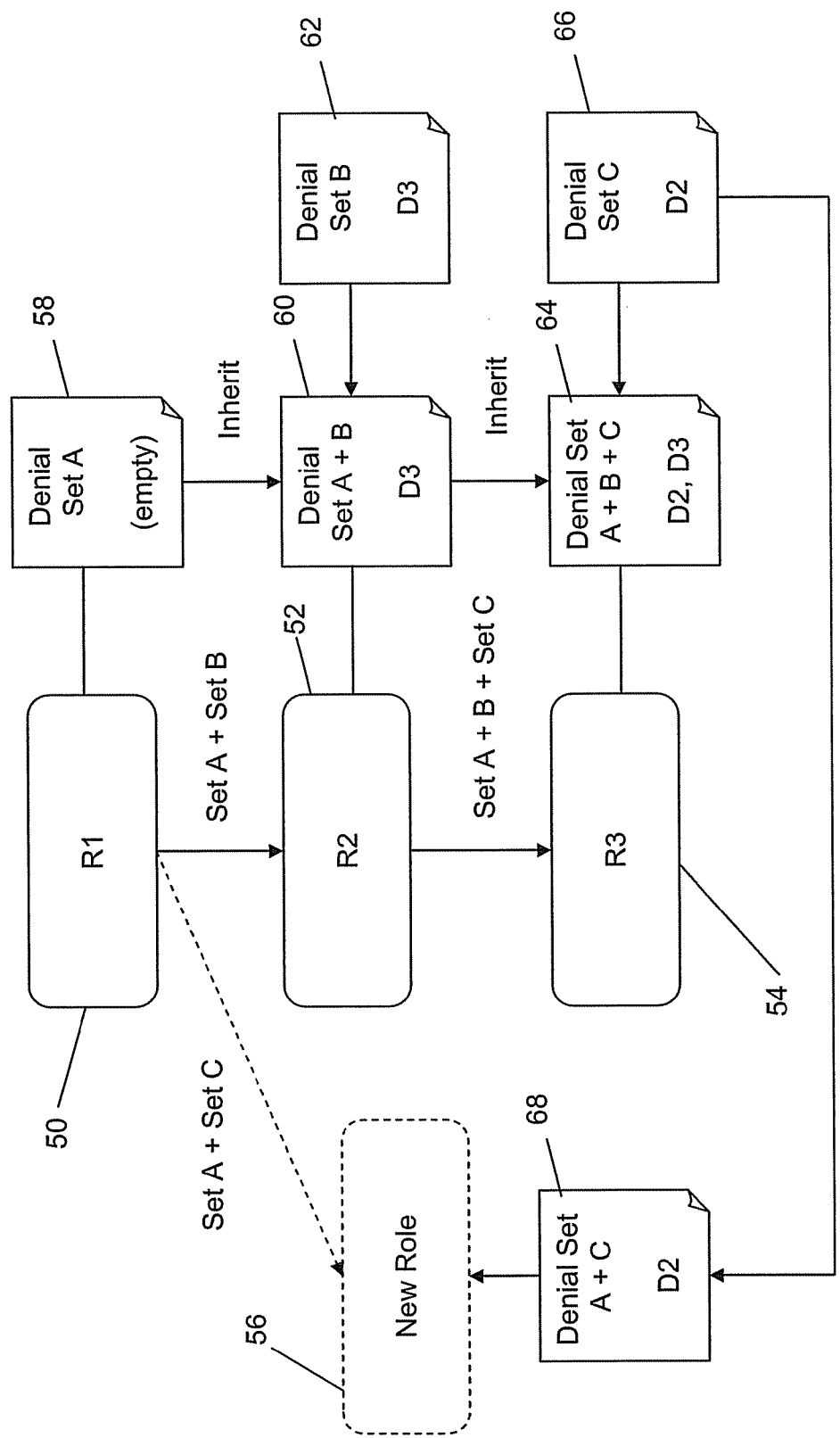
FIG. 4 is a flow diagram illustrating an example role hierarchy structure.

As discussed, the roles 32, 32' shown in FIGS. 2 and 3 can be related to one another using hierarchical relationships. In this way, a set of permissions 34 or denials 42 associated with a given role 32, 32' can be expanded to include any permission 34 or denial 42 that is inherited from another role 32, 32'. Turning now to FIG. 4, a hierarchical relationship between R1, R2, and R3 is provided that corresponds to the denial sets shown in FIG. 3.

A first node 50 corresponds to R1, which has associated therewith a first denial set 58, namely Set A that is an empty list or placeholder object. By extending from R1, a second node 42 corresponding to R2 inherits Set A and by adding a second denial set 62, namely Set B, a first extended denial set 60, namely Set A+B is associated with the second node 52. By extending from R2, a third node 54 corresponding to R3 inherits the second denial set 62, namely Set A+B, and by adding a third denial set 66, namely Set C, a second extended denial set 64, namely Set A+B+C is associated with the third node 54. A new role is also shown in FIG. 4, thus creating a fourth node 56. It can be appreciated that the fourth node 56 is not necessarily lesser in importance than the second node 52 nor more important that the third node 54, for example—the hierarchy can be used to define how denials 42 are inherited in an object-oriented manner rather than define a strict organizational structure. The fourth node 56 in this example inherits the empty Set A from the first node 50 and adds the third denial set 66, namely Set C to create a fourth extended denial set 68, namely Set A+C. Therefore, it can be appreciated that the hierarchy of roles can be structured based on inheritances and thus similarities with other roles and does not necessarily reflect the relative importance of the nodes created and the subjects 19 having roles 32, 32' corresponding to the nodes.

Figure 5:
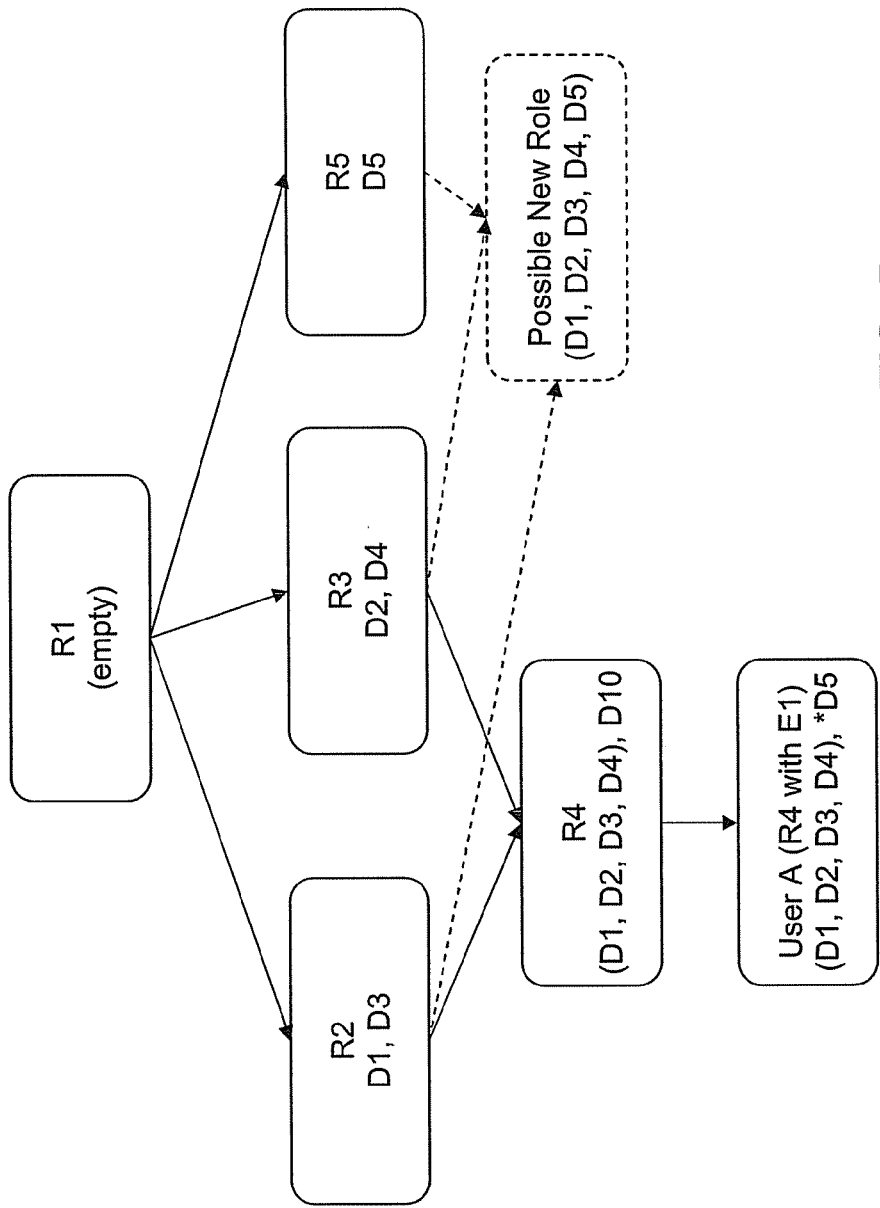
FIG. 5 is a flow diagram illustrating another example role hierarchy structure.

FIG. 5 provides another example role-based hierarchy to illustrate the various ways in which roles 32' may inherit negative permissions, and how exceptions may be permitted. In this example, a set of 12 distinct actions is assumed. R1 is again an empty set that indicates all actions are permitted if given R1 (e.g. an administrator 22). R2, R3, and R5 all inherit this empty set and add particular sets of denials. R2 denies actions A1 and A3 (denoted D1 and D3), R3 denies actions A2 and A4 (denoted D2 and D4), and R5 denies action A5 (denoted D5). It can be seen that R4, which is to deny A1-A4, plus A10, can inherit both R2 and R3 and additional deny D10. Therefore it can be appreciated that multiple roles can be inherited. It may also be noted that if R4 did not add D10, the access control system 10 could instead enable subjects 19 to be given both roles R2 and R3 to in effect have the combined set of denials. FIG. 5 also illustrates an exception E1 associated with User A. In this example, User A is given role R4 but is denied access to A5 instead of A10. Although a new role 32 could be created for User A (as shown in dashed lines), the exceptions enable true exceptions to be created until enough subjects 19 have the same exception thus warranting a new role. The new role could be created by inheriting R2, R4, and R5.

It may be noted that the denials (D1 ... DN) are not necessarily redundantly associated with each role 32, 32'. The arrows suggest "inheritance" and thus the bracket surrounding the inherited denials 42 indicates in this example that the ACLs 28, 28' do not need to be attached in a flat way to a node in the security model (a node being either a Role 32 or a User), but rather ACLs 28, 28' are set at specific nodes in the ancestry and inherited by children nodes. For instance, the role R4 has D1, D2, D3 and D4 in brackets to suggest they are inherited and only D10 is shown as an additional denial 42. Also, D5 in the User A definition has an asterisk to indicate that it is a swapped denial due to an exception.

It may also be noted that roles 32, 32' may be defined to map closely to an application menu. The granularity depends on how many levels the menu has. If we roles 32, 32' are not defined in that way, it can be more difficult to describe ACLs 28, 28' hierarchically. The following example is based on a DVD analogy: An application has the following menu hierarchy:

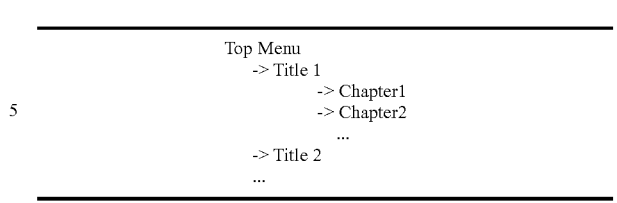

A role R1 may be defined that is granted everything in this branch: Top Menu→Title 1. A role R2 can also be defined that inherits from R1 but is denied access to Top Menu→Title 1→Chapter 2. In effect, R2 is granted any action within Title 1 (viewing/modifying any chapter) with the exception of Chapter 2.

Figure 6:
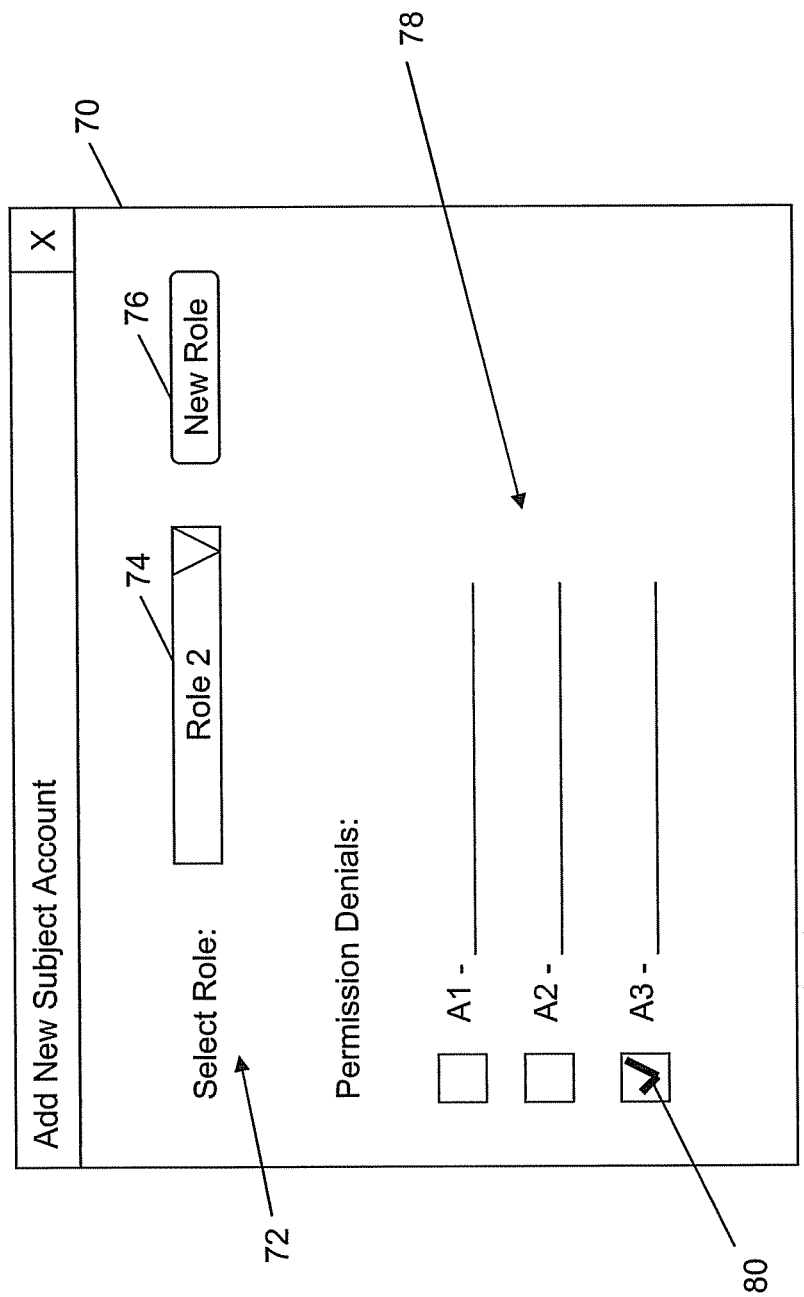
FIG. 6 is a screen shot illustrating an example user interface (UI) for adding a new account for accessing the restricted environment.

FIG. 6 illustrates a screen shot of an example user interface (UI) 70 for adding a new subject account for the access control system 10. It can be appreciated that the same or similar functionality can be used for modifying an existing user account (not shown). In this example, the UI 70 provides a role selection option 72, which comprises a pull down list 74 of existing roles 32, 32', and a new role button 76, which may be selected to define a new role 32, 32'. Whether an existing role 32, 32' is chosen, or a new role 32, 32' is created, a list of resources 78 is provided, for selecting those resources 14 that should be denied to the particular role 32, 32'. Each entry in the list 78 comprises a checkbox 80 that when selected denies access to that resource 14. It can be appreciated that for an existing role, the list 78 may pre-populate those denials 42 already associated therewith and thus any further selections or de-selections would correspond to exceptions made for that particular subject 19. An example provided below is given to further illustrate this principle (see FIGS. 15 and 16).

It has been recognized that by using the negative permission scheme discussed above, various malicious attacks can be thwarted. For example, an adversary that attempts to hack into the access control system 10 to create a new account with unlimited permissions would likely select many or all of the checkboxes 80 possible which would have the opposite effect that was intended, namely the adversary would instead be denied many or all actions in the environment 12. In other words, the effect of deselecting all checkboxes is that nothing gets sent to the server. In HTML, values for the checked boxes are part of the payload sent over HTTP. Values for the unchecked boxes are ignored. Note that this only applies for entitlements administration over Web.

Figure 7:
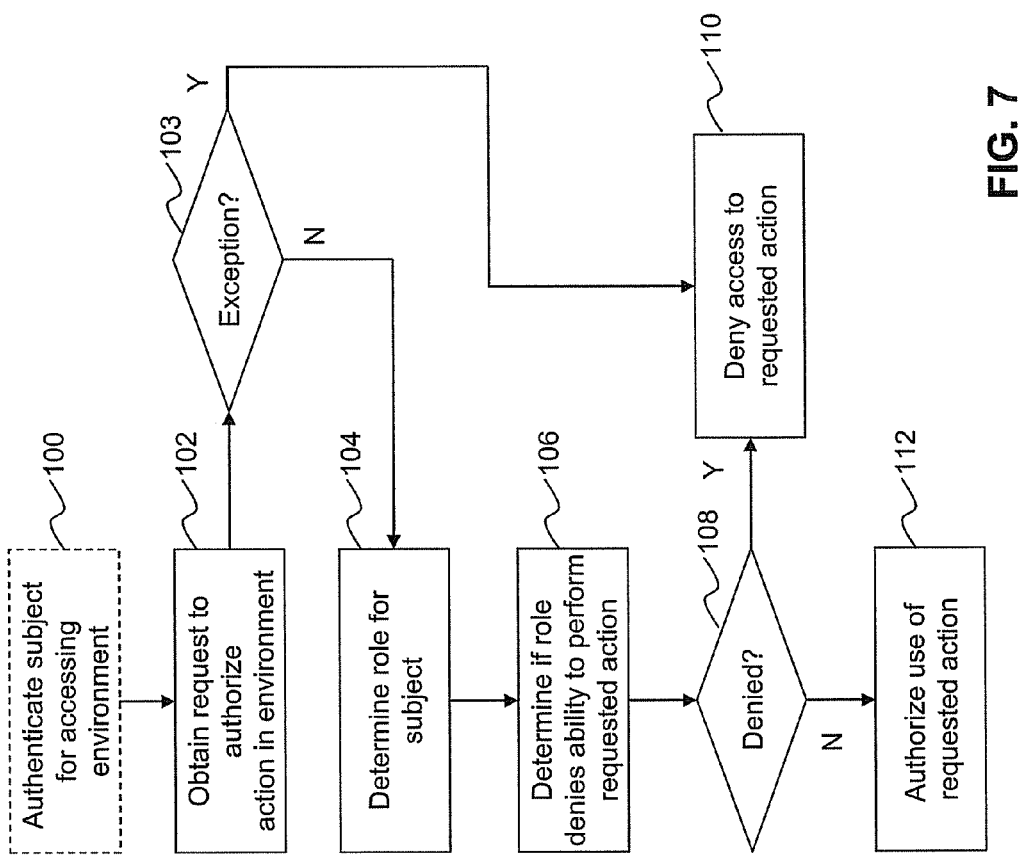
FIG. 7 is a flow chart illustrating an example set of computer executable instructions for controlling access based on negative access permissions.

FIG. 7 illustrates an example set of computer executable instructions that may be executed by the communication interface 26 for controlling access to a resource 14 in the environment 12, based on negative access permissions. At 100, the communication interface 26 would perform or have performed, an authentication process (not shown) to authenticate the subject. For example, a username and password may be required to ensure a valid user is trying to access the system. This operation is shown in dashed lines in FIG. 7 to indicate that it may be done at an earlier time (e.g. if user enters a wider system for some other reason). At 102, the communication interface 26 obtains a request to authorize a particular action in the environment 12. In this example, since exceptions are permitted, the communication interface 26 may first determine if there is a user-specific exception associated with the requesting subject 19 at 103, e.g. by referencing the access control list 28'. If an exception exists and that subject 19 is not permitted to perform the requested action (regardless of their assigned role(s) 32'), the communication interface 26 can immediately deny access to the requested action at 110. If an exception does not exist for that subject 19, the communication interface 26 then determines the role(s) 32' associated with the subject 19 at 104. By determining the role(s) 32', the communication interface 26 may then determine if the role denies the ability to perform the requested action at 106. If the role 32' denies this action at 108, operation 110 is performed. If not, use of the requested action is authorized at 112.

Figure 8:
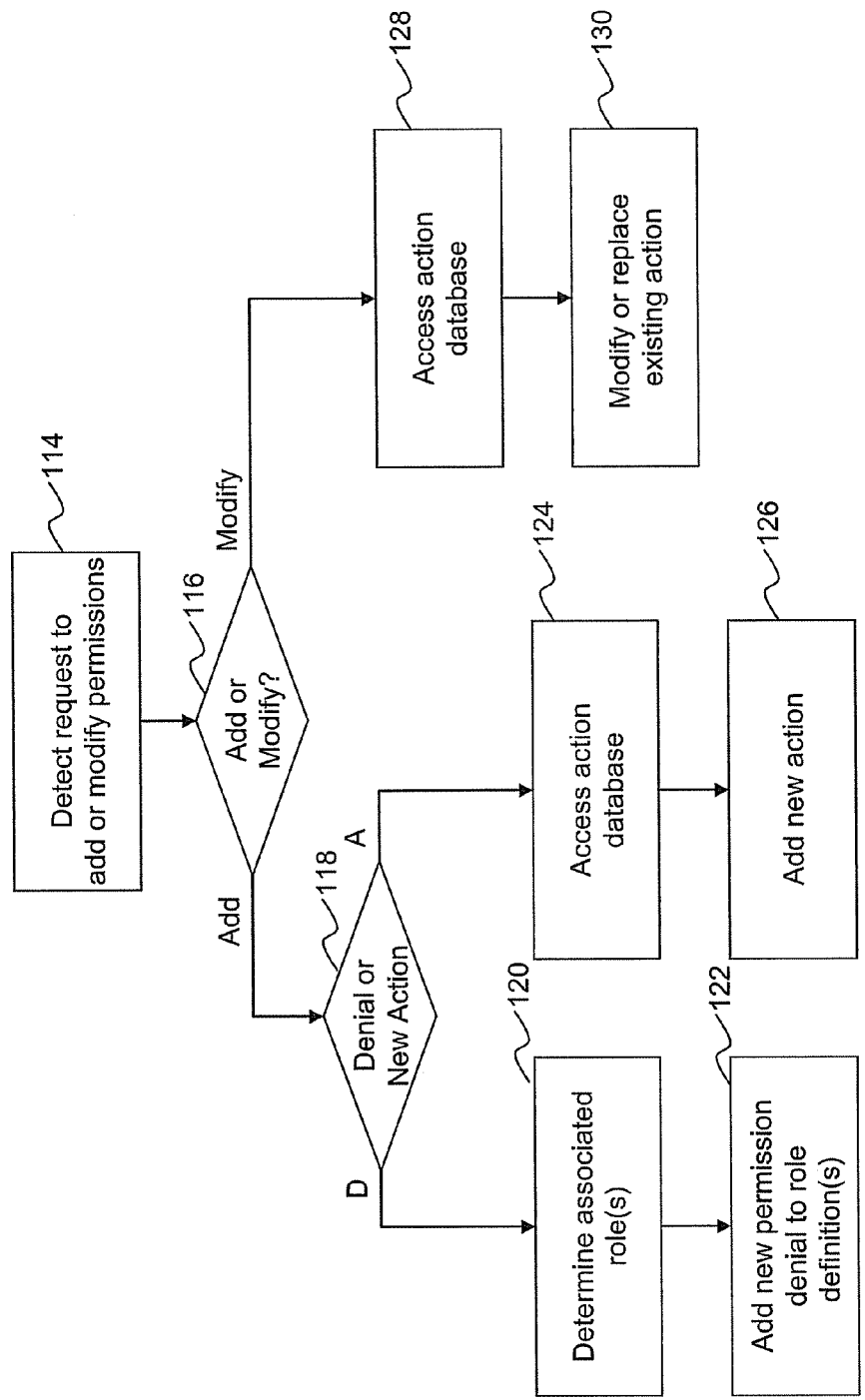
FIG. 8 is a flow chart illustrating an example set of computer executable instructions for adding or modifying negative permissions.

FIG. 8 illustrates an example set of computer executable instructions that may be executed by the administrator interface 36 for adding or modifying negative permissions. At 114, the administrator interface 36 detects a request to add or modify the permissions (e.g. via a user interface made available to an administrator 22). The administrator interface 36 then determines at 116 if the requestor is attempting to add or modify a permission. If the requestor wishes to modify a permission, the administrator interface 36 accesses the action database at 128 and modifies or replaces an existing action at 130 to thereby perform the requested modification. For example, an old protocol may be upgraded with a newer protocol.

If the requestor is trying to add a new permission, the administrator interface 36 determines at 118 whether the addition is a new denial or a new action and thus whether the action database 44 or role definition database 30' is to be updated. If a new denial 42 is to be added, the administrator interface 36 determines the associated role(s) 32' that will be affected at 120 and adds the new permission denial 42 to the role definitions at 122. If a new action is to be added, the administrator interface 36 accesses the action database 44 at 124, and adds the new action at 126.

Figure 9:
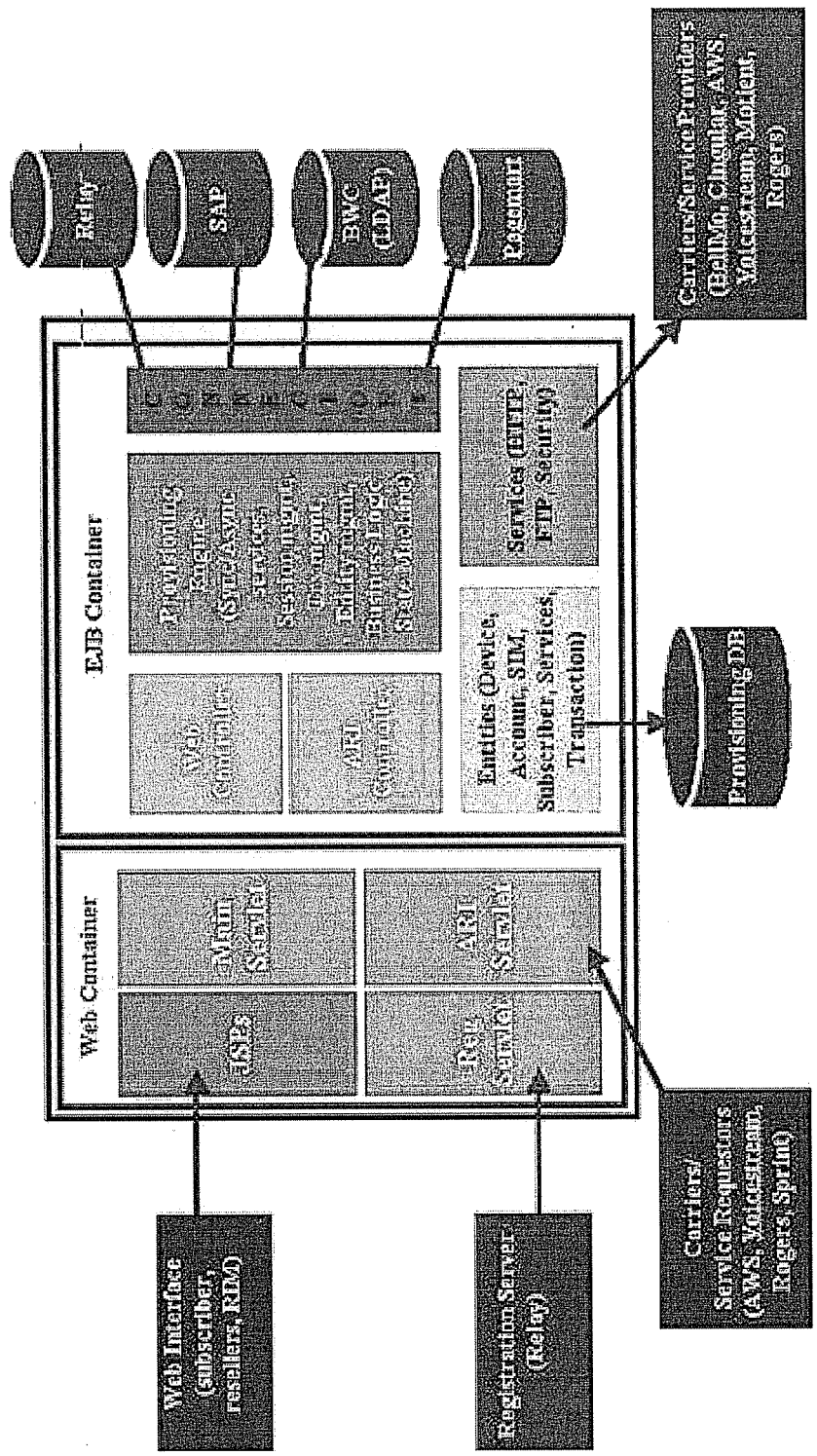
FIG. 9 is a block diagram of a provisioning system incorporating the access control system of FIG. 3.

FIG. 9 illustrates an example environment 12, comprising a wireless communication and mobile device infrastructure having a provisioning system. The provisioning system is a mission-critical system that often acts as the backbone of the mobile device infrastructure. Provisioning provides service access control to the customers (telecommunication carriers). The carriers act on behalf of their subscribers to enable/disable/add/modify/remove services on/from the device. Provisioning interfaces with various external systems as well as many systems internal to the infrastructure as shown in FIG. 9. FIG. 9 shows the provisioning system in the center of the figure, exposing various interfaces to external systems such as SAP, Relay, Carriers etc. By incorporating the access control system 10 into the infrastructure shown in FIG. 9, any of the systems external to the provisioning system (the "clients") will need to pass the authorization access checks in order to perform their functions. Although not represented explicitly in FIG. 9, the access control system 10 shields provisioning from all incoming requests (3 arrows on the left drawn from the clients towards Provisioning) to perform it authorization operations.

It has been realized that the negative logic scheme described above is suitable to provisioning because, as will be discussed in more detail below, the ACL management may be exposed over the Web using a GUI that has been familiar to the users for many years—in other words, it may not be easily changed. Also the negative logic saves a lot of time and prone to errors updates to a system when new features and functions are added with each new release. Without the negative logic, each new feature/function and related permissions would need to be granted specifically to each user/role that is entitled to perform that function. Without the negative logic, for each release of the system, all or most ALCs 28, 28' need to change because most likely existing users and roles would need access to the new functions.

In a provisioning system such as that shown in FIG. 9, it has been found that a web interface therefor may provide access to business functions primarily on the client side. While there may be some server-side access checking, often this is minimal and not consistent. The disadvantage, of course, is that malicious users can spoof server requests and gain access to other business modules. In a more specific case, a user with a lesser role can create a user with more privileges. Somebody logged in as a support user can submit HTTP POST requests to the server and they will be executed without first checking whether the user is authorized to perform those requests. The above-described access control system 10 can be considered an Access Control List Framework (or ACL, for short) 10 that can be introduced into the provisioning system (or PRV for short), to provide server side access checking. At a high level, an ACL Service determines if a user has sufficient permissions to perform actions and access resources.

The ACL framework 10 can be configured to comprise 3 components: the front controller, the ACL Service, and the access control lists 28, 28'. The front controller sits in front of PRV's presentation tier, intercepting and validating requests. This acts as a shield to PRV's business logic and can be implemented as a servlet filter. The ACL service is an authorization service that determines if the user has the permissions to perform the requested actions and access resources, and grants access accordingly. ACLs 28, 28' are defined for users and are stored in the database. This feature is backward compatible, maintaining the assigned association previously defined in PRV. The ACLs 28, 28' are loaded only one at application startup. Once loaded, the object model is cached; access checks are made against what is loaded in memory, reducing database hits.

Figure 10:
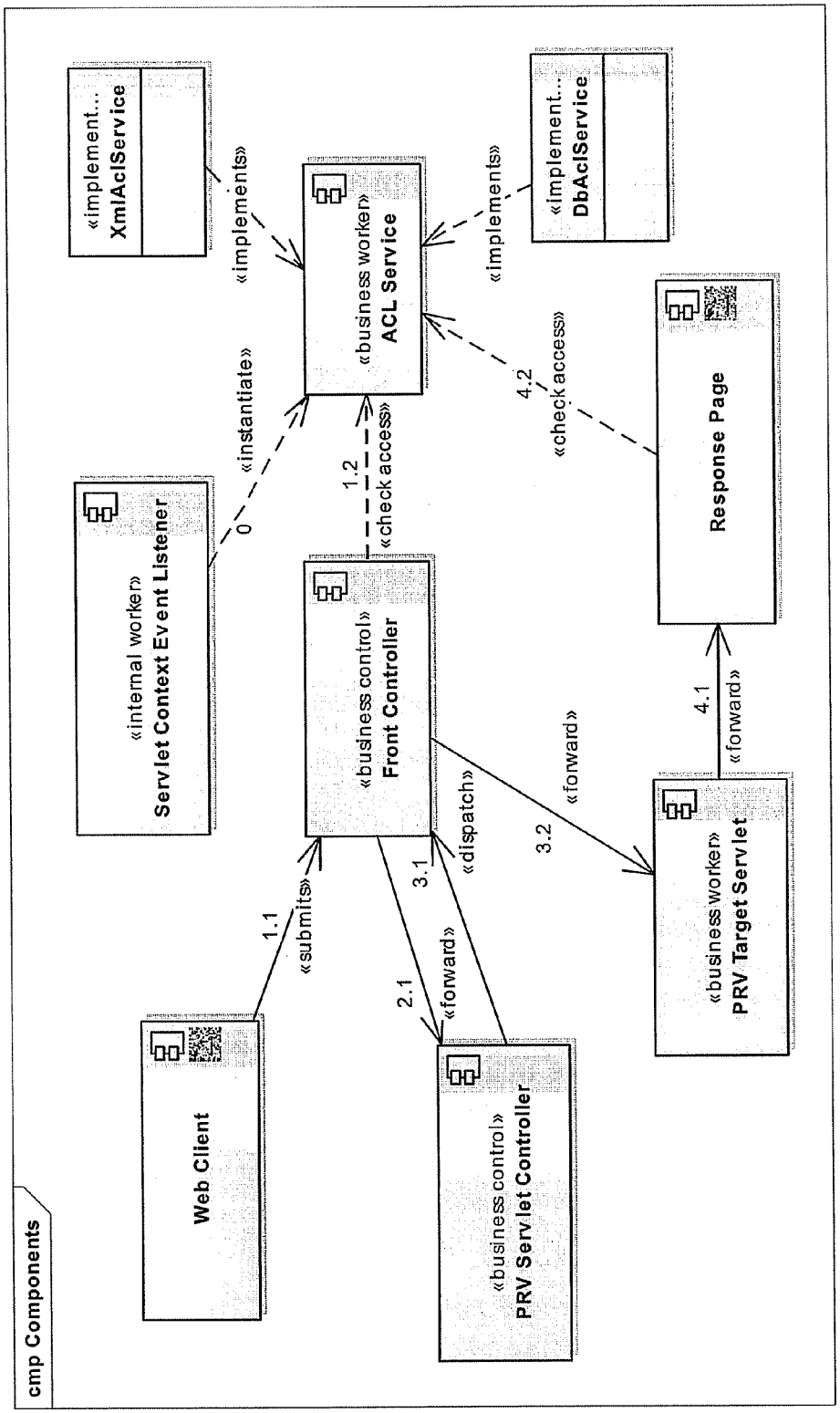
FIG. 10 is a block diagram illustrating components used by an access control system incorporated into a provisioning system.

FIG. 10 illustrates typical ACL components and how they interact with PRV. The front controller in this example is implemented as a servlet filter. This filter intercepts all HTTP requests. Authorization is performed by mapping incoming requests to ACL permissions, and asking the ACL Service, "is this user granted the privilege to execute this action against this resource?" The mapping part involves reading a clientAction request parameter, which is submitted as a hidden form field, and the request context path. If the ACL Service determines that access is granted, the request continues to its intended target. Otherwise, an AuthorizationException is provided, and a HTTP 403 response is returned, which is mapped to a new error page, authError.jsp shown in FIG. 11.

When an access check fails, the event can be written to a wrapper log at INFO level. The user, action, and resource may then be logged, along with the user's ACL. As noted above, the ACL Service attempts to answer the question, "is this user granted the privilege to execute this action against this resource?" The ACL Service would then need 3 inputs to answer this question:

1) User—For HTTP requests, this is the User object stored in the session. For non-interactive requests, the request sender passes along some authentication token to be able to retrieve a valid user from the ACLs.

2) Action—Usually provided as a request parameter, it is one of multiple actions that a user can perform while working on a certain resource. If no action is specified, the read-only access is assumed.

3) Resource—This is determined based on the "action". If no action is specified, it is determined from a mapping between PRV servlets and their functional scope.

Figure 13:
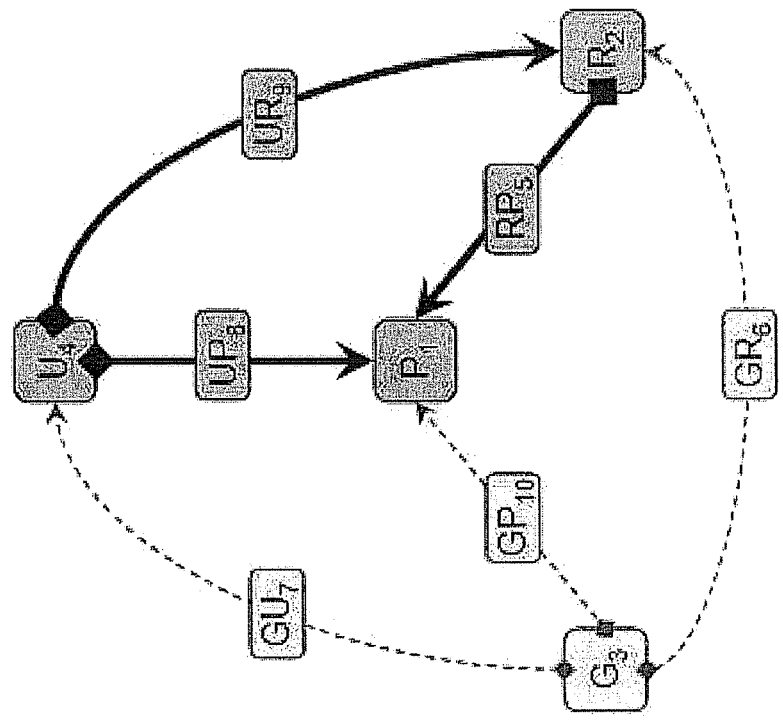
FIGS. 12 and 13 are state diagrams illustrating role and permission relationships.
Figure 12:
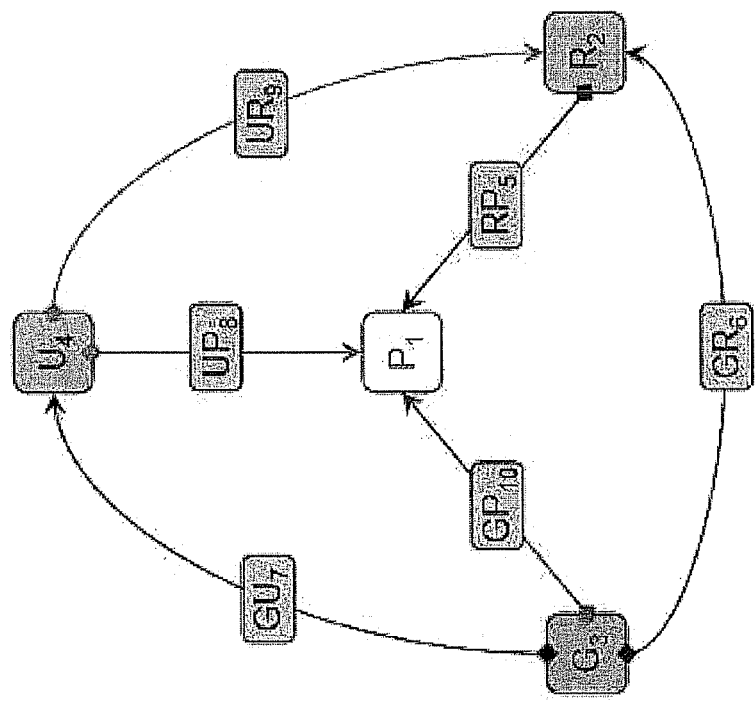

ACLs can be specified in any number of ways, as shown in FIGS. 12 and 13. Roles 32, 32' can have 1 or more permissions, users can have 1 or more explicit permissions, users can have 1 or more explicit roles 32, 32', but to be backward compatible with existing accounts, a user will only be assigned 1 role 32, 32', users can be members of 1 or more groups, and groups can be considered special cases of users and so all of the above apply.

There are seven basic roles defined for the PRV shown herein, namely account manager, service manager, non-bill service manager, system manager, OTAS manager, read only administrator, and an infrastructure administrator. These roles are not typically assigned directly to existing users or new users, instead PRV can have composite roles which will use all or some of the permissions given by the basic roles 32, 32'. The basic roles 32, 32' assist in defining the composite roles 32, 32' and also define logical grouping of permissions as they relate to certain provisioning modules. Composite roles 32, 32' are used to achieve the inheritance principles described above, and to reduce redundancy. One can override a basic role 32, 32' by extending it with a composite role 32, 32' but specifically granting or denying one or more actions.

In one example, the a support role 32, 32' can be configured to inherit all permissions from the account manager, non-bill service manager, and the OTASL manager roles 32, 32'. The support role 32, 32' can thus perform partial account and service management. Permissions can be denied or granted by inclusion or omission of the "-" prefix. For "accountManagement", it is easier to deny 4 out of 10 permissions, and similarly for "serviceManagement" it is easier to grant 3 out of 6 permissions. Permissions not explicitly granted are only available through role extension. For example, because "resetPassword" is part of "accountManagement", and we have not explicitly granted it, the "support" role inherits this permission.

It was found that in the current model for security in provisioning, an ACCOUNT is an abstraction of a USER in PRV, a USER_TYPE (attribute of an ACCOUNT) is similar to a role 32, 32', and each ACCOUNT is associated with one user type. PERMISSIONS are then statically linked to a USER_TYPE and dynamically linked to an ACCOUNT at the time the account gets created or updated. A PERMISSION may be linked to one or more USER_TYPEs, and CUSTOMER_TYPE is linked to one or more USER_TYPEs and associated with a SAP_CUSTOMER. ACCOUNTS are linked to 1-to-1 with a SAP_CUSTOMER.

Figure 14:
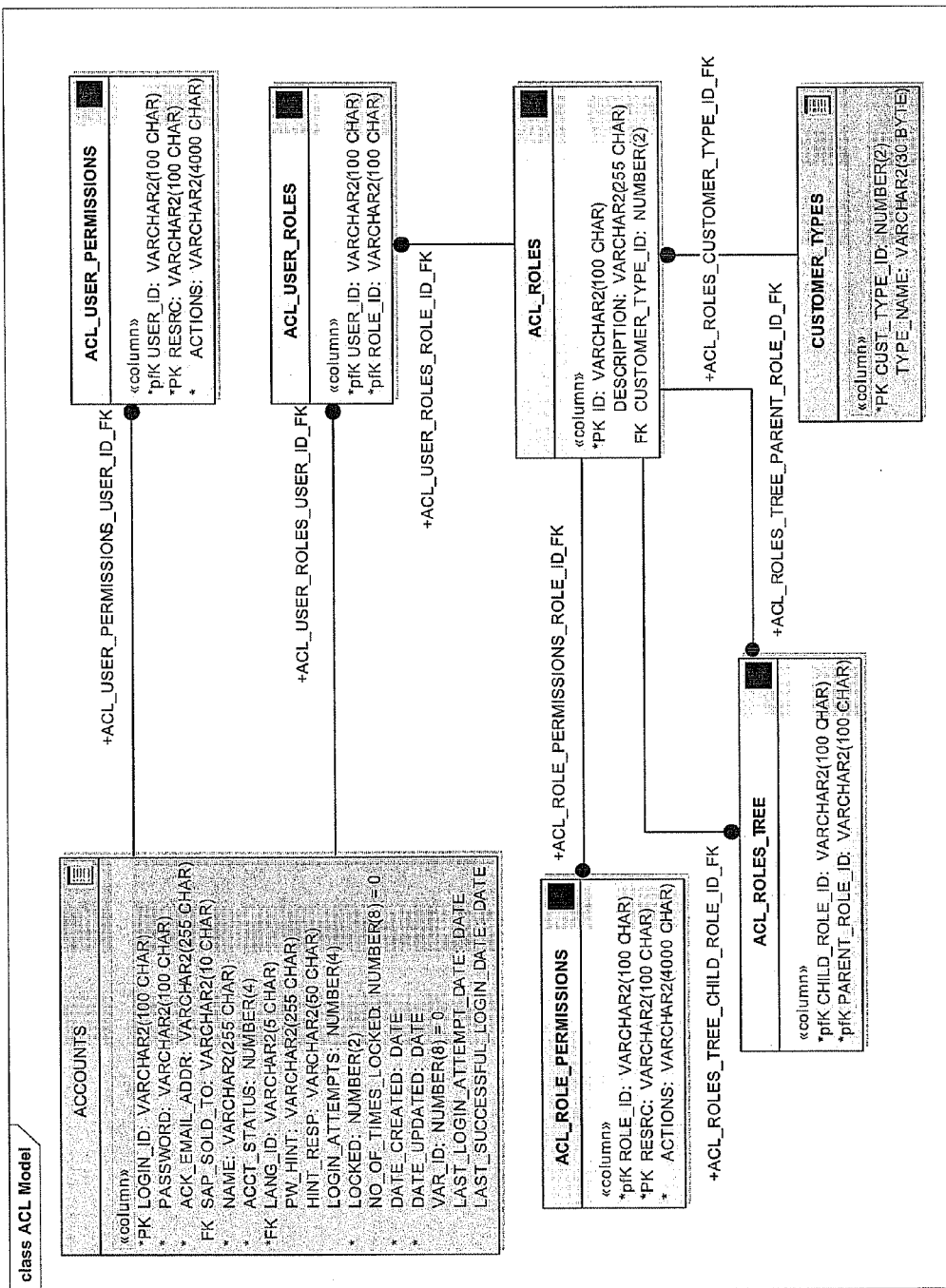
FIG. 14 is a block diagram illustrating an example access control list model for implementing an access control system with a provisioning system.

By incorporating the ACL 10 described herein, a new model, shown in FIG. 14 may be provided. In the new model, the ACCOUNTS and CUSTOMER_TYPES tables are preserved. The new tables are ACL_USER_PERMISSIONS, ACL_USER_ROLES, ACL_ROLES, ACL_ROLE_PERMISSIONS, ACL_ROLES_TREE. The delta script for 5.0.3 will create this new model and seed it with the appropriate data (e.g. basic roles, permissions, etc. . . . ). The script will also migrate the user data from the older model into this new schema. Once data population is complete, the old tables will be dropped, in favor of this model. The rollback script can completely revert the schema, and repopulate the data to the original tables, if necessary. The ACCOUNTS table will continue to store users and their attributes. The new ACL_ROLES table will have the same semantics as the old ROLES table, but will have different content. The ACL_ROLES_TREE table will model the role inheritance model that has been introduced. To support a user having multiple roles in the future, the USER_TYPE_ID attribute has been moved from the ACCOUNTS table and into the ACL_USER_ROLES table.

Roles and Users can have their associated Permissions defined in the ACL_ROLE_PERMISSIONS, and ACL_USER_PERMISSIONS tables, respectively. The structure and content of these two tables are ACL oriented; they may have nothing in common with the old PERMISSIONS, ROLE_PERMISSIONS, and ACCOUNT_PERMISSIONS tables.

Records in the ACL_USER_PERMISSIONS table override the permissions given by the Role (for instance to deny some actions that normally are granted by the role). The USER_ID will be the User's login Id from the ACCOUNTS table. Roles and Permissions are not given numeric identifiers in the example shown in FIG. 14. Role IDs are descriptive character attributes and permissions will be defined through the couple (resource, actions) as explained earlier. The hierarchy of roles is defined as multiple inheritances (one child—multiple parents) and not as aggregation (one parent—multiple children). The basic and composite roles will be defined in ACL_ROLES table while their relationship will be defined in the ACL_ROLES_TREE table.

The following tables illustrate how the data is structured in the new schema, using the example discussed earlier.

| ACL_ROLES | | |
|---|---|---|
| ROLE_ID | DESCRIPTION | CUSTOMER TYPE |
| Account Manger | Performs account management | N/A |
| Service Manager | Performs service management | N/A |
| Non-bill Service Manager | Performs non-billable service management | N/A |
| OTASL Manager | Performs OTASL management | N/A |
| Support | Performs support tasks | Infrastructure |

| ACL_ROLE_PERMISSIONS | | |
|---|---|---|
| ROLE_ID | RESOURCE | ACTIONS |
| Account Manger | account management | * |
| Service Manager | service management | * |
| Non-bill Service Manager | non-bill service management | * |
| OTASL Manager | OTASL management | * |
| Support | account management | modify parameters, manage partners, manage VARs, manage subscribers |
| Support | service management | activate, deactivate, bulk |

In the ACL_ROLES table are the 5 basic roles previously described. In the ACL_ROLE_PERMISSIONS, we see that AccountManager, ServiceManager, NonBillServiceManager, and OTASLManager can perform all actions on their respective resource, as indicated by the asterisk in the ACTIONS column. The support role has some permissions denied against the "accountManagement" resource, and some explicitly granted for the "serviceManagement" resource.

| ACL_ROLES_TREE | |
|---|---|
| CHILD_ROLE_ID | PARENT_ROLE_ID |
| Support | account manager |
| Support | non bill service manager |
| Support | OTASL manager |

| ACL_USER_ROLES | |
|---|---|
| USER_ID | ROLE_ID |
| Ganymede | support |

| ACL_USER_PERMISSIONS | | |
|---|---|---|
| USER_ID | RESOURCE | ACTIONS |
| Ganymede | service management | activate |

The ACL_ROLES_TREE data depicts role extension; the support role extends from the Parent roles: AccountManager, NonBillServiceManager, and OTASLManager. In the ACL_USER_ROLES table the user "Ganymede" is given the role "support". In the ACL_USER_PERMISSIONS table, the user "Ganymede" has been explicitly denied the "activate" permission. Because of this user's role membership, "support", it was previously granted, but a user with a higher authority level was able to deny it.

Referring now to FIG. 15, a Create User page is shown. A role is assigned by selecting a "Title", after which a set of permissions associated with the role 32 is displayed. When a box is checked, that permission is granted. If un-checked, then that permission is denied. Permissions that can neither be given nor denied are visible on the page but disabled (grayed out). In a scheme utilizing positive permissions, as shown in FIG. 15, a malicious user can construct a more powerful user by altering the HTTP POST and adding "checked" permissions which are just numeric IDs. In this example, the user is aware of the existence of the "Reset Password" permission and can possibly alter the POST request to include that permission.

As discussed above, now making reference to FIG. 16, the use of the negative permissions described herein can address these problems. For example, the reverse logic described above can also applied to the way the checkboxes work. The user interface 200 shown in FIG. 16 enables a particular user to create a new user such that the sub-set of permissions granted to the new user are equal or less than those granted to the particular user or "creator". By selecting a role from a Title drop down menu 202, the permissions associated with the selected role are initially applied as a complete set. In the example shown, the permissions granted for the selected role will be equal or less than those of the creator. By associating a set of permission denials with a particular role, any attempt to maliciously add permissions or create a user with an inappropriate role, can be thwarted by an additional validation at the server side, namely by determining whether or not the user type is appropriate to the role.

Once a role is selected from the drop down menu 202, rather than enabling selection of permissions to be granted to the user being created as shown in FIG. 15, the permissions 204 that can be granted to a user having the selected role are listed with a selection mechanism such as check boxes as shown in FIG. 16. In this way, the user creating the new user can only see the permissions they would be given (or a sub-set thereof) and any selections would amount to adding an indication of a denial to a request to create the account and thus the user profile, thereby taking that permission away (e.g., individual selections or "select-all" type inputs). A checked box in FIG. 16 indicates a denied permission (emphasized by highlighted font). Unavailable permissions are not displayed, as opposed to being grayed out. If a malicious user alters the request (e.g. HTTP POST) and adds permissions, they are effectively denying themselves more permissions. Even if such extraneous indications of permission denials are maliciously added to the request via checked boxes they can be ignored at the server side by not belonging to the selected title. In other words, the selected title or role will have a predetermined set of permission denials and thus a denial added to the request would not only have the opposite effect, it can be detected as a malicious modification due to the denial being associated with a permission already denied to that role. It can also be appreciated that other modifications to the request that may be capable of adding permissions would also be rejected on the server side by knowing which permissions and denials should be associated with a particular role. In this case, checking all boxes will deny all permissions for that role thus thwarting the attack since the created user would have no permissions.

It can therefore be appreciated that the security hole that was identified with respect to the use of positive permissions can be closed by providing the user interface of FIG. 16 and additional server side validations based on the selected role and the associated permission denial set for that role. This enables tighter security at the presentation level by the addition of the front controller. The introduction of the concept of Access Control Lists adds a more granular definition of what a user can or cannot do. Roles and permission sets can be inherited and extended. The ACL system 10 also provides the groundwork for other enhancements such as implementing the concept of groups, separation of duties, audit trails, etc.

Turning now to FIG. 17, an example screen shot 206 is shown for a user editing their own profile. It can be seen in FIG. 17 that the role is no longer selectable such that the user cannot change their role and can only update their user name, password and email. Also, since the role cannot be changed in this example, no checkboxes are shown and thus the user cannot view any permission set and thus would not be able to discover permissions that could be added. As such, the minimal information is presented to the user to avoid being able to discover which other permissions may exist and to have those permissions added or denials removed.

Figure 18:
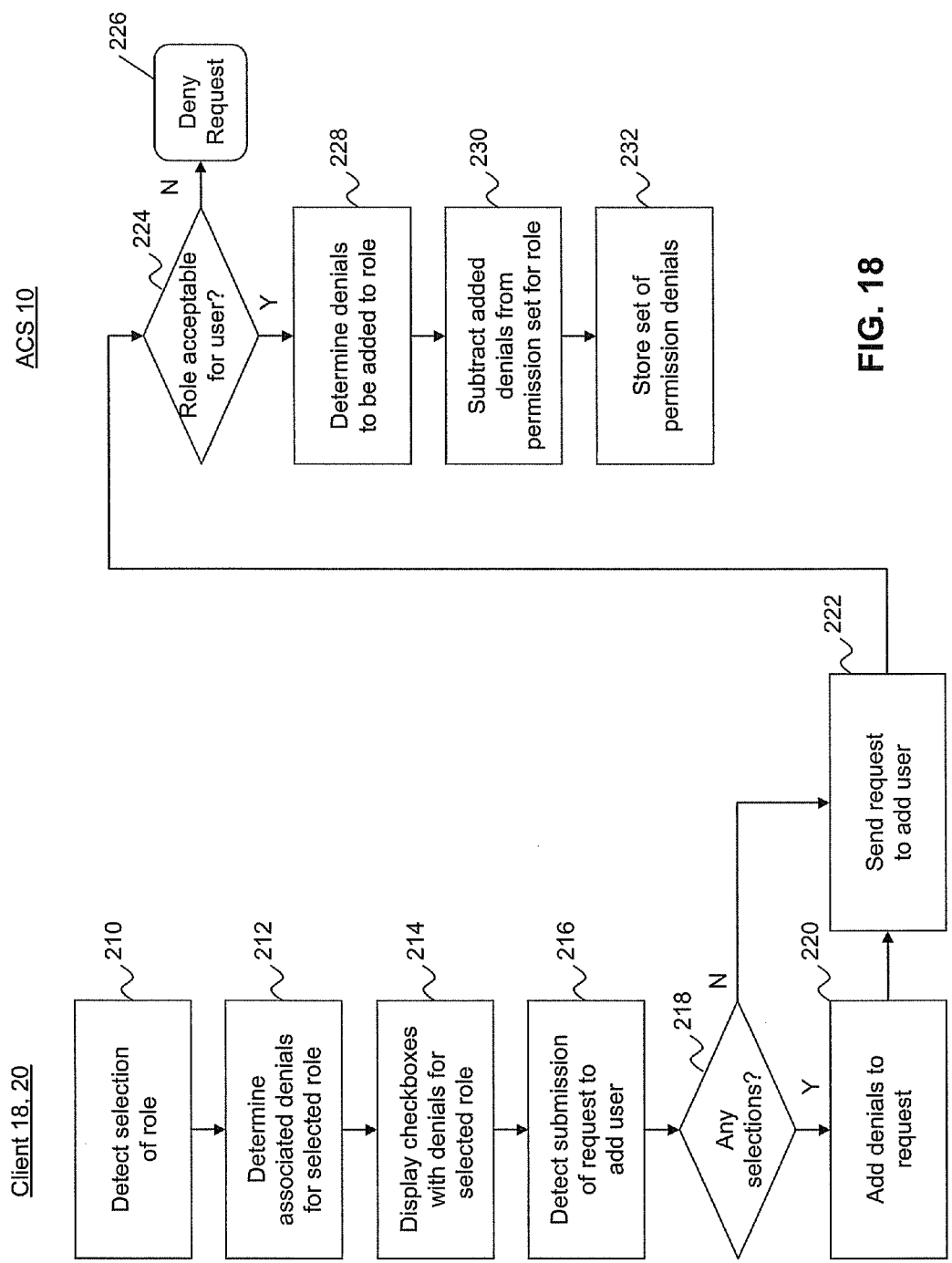
FIG. 18 is a flow chart illustrating an example set of computer executable instructions for adding a new user account.

FIG. 18 illustrates an example set of computer executable operations that may be performed in creating a new user via the UI 200 shown in FIG. 16. At 210, the selection of a role is detected. Based on the selected role, the associated denials for that role are determined at 212, and the UI 200 is updated at 214 to include the permissions 204 denied to that role and check boxes are shown with each denied permission 204. At 216, the submission of a request to create or add a new user is detected (e.g. upon detecting selection of the "Submit" button shown in FIG. 16). At 218, whether or not any permissions 204 have been selected is determined. If one or more checkboxes have been selected, the denials are added to the request to be sent to the ACL system 10. It can be appreciated that the request may alternatively include the permissions remaining instead or the denied permissions. The request, which includes the username, password, role, email address, and language selections, as well as any denied permissions 204 is then sent to the ACL 10 at 222. The request received by the ACL 10 may then be examined by the ACS 10 and whether or not the role is acceptable to the user is determined at 224. If not, the request is denied at 226. If the user is capable of having the requested role, any denials included in the request are determined at 228. If at least one additional denial has been selected for the new user, the permission set associated with the specified role, which would remain static for any user having that role, may be obtained and the set of denials specified in the request subtracted therefrom to effectively obtain the permission set for the particular user being created. The inverse of the resultant permission set would be the permissions that are denied to that user and those may be stored as illustrated in the example embodiments above. It can be appreciated that for a new user, the denials specified in the request may also be added to the inverse of the permission set for the role instead of performing the subtractions shown.

Figure 19:
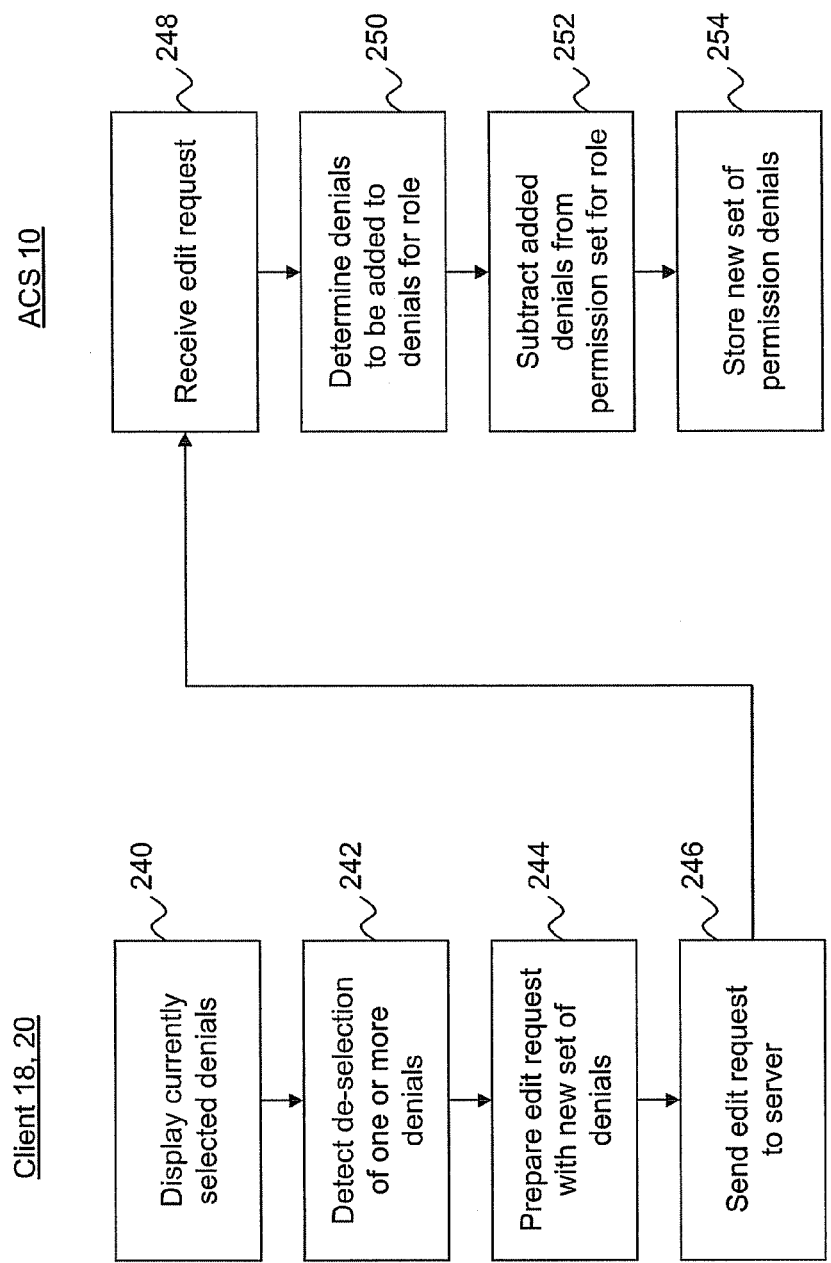
FIG. 19 is a flow chart illustrating an example set of computer executable instructions for adding a previously denied permission.

If a permission has been denied to a user when that user is created, in order to subsequently update that user's profile to grant that permission, the operations shown in FIG. 19 may be executed. The administrator or other user having authority over the user being edited may display the currently selected denials at 240 by displaying the UI 200 shown in FIG. 16. A de-selection of one or more checkboxes detected at 242 then causes a request to edit the user to be prepared at 244, which would include a complete new set of denied permissions 204. For example, if 4 denied permissions 204 were originally checked when the user was created, and 1 denied permission 204 was de-selected, an edit request specifying the remaining 3 denied permissions 204 is prepared. The edit request is sent to the ACS 10 at 246, which is received by the ACS 10 at 248. It can be appreciated that for an edit request, since the user is already created, a server-side validation could also be performed as shown in FIG. 18 to ensure that the new set of denied permissions 204 are appropriate for the user. In the example shown in FIG. 19, the ACS 10 determines the set of denied permissions 204 in the edit request at 250, and subtracts these from the list of permissions associated with the user's role in general at 252, to obtain the new set of permissions. This effectively adds the previously denied permission since the subtracting would include an additional permission. The inverse of the permissions may then be stored at 254 as a new set of permission denials for that particular user.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the access control system 10/10', communication interface 26, access control list 28, database 30/30', administrator interface 36, environment 12, or accessible or connectable thereto. Any application or module herein described may be implemented using computer readable/executable instructions that may be stored or otherwise held by such computer readable media.

In general, there may be provided a method, computer readable medium and device for providing access control, wherein the method comprises: defining one or more roles; for each role, associating one or more actions pertaining to resources in a system that cannot be performed by a subject associated with a particular role; upon obtaining a request to perform a particular action, determining a corresponding role associated with a requestor, and determining if the particular action is denied to subjects having the corresponding role; and enabling access to the corresponding resource for the particular action for performing the particular action, if the particular action is not denied to that role.

Although the above has been described with reference to certain specific embodiments, various modifications thereof will be apparent to those skilled in the art without departing from the scope of the claims appended hereto.

The invention claimed is:

1. A method of providing access control, the method comprising:
enabling creation of a user account for accessing a system by displaying a list of a plurality of resources in the system that the user account has access to, each resource in the list having associated therewith a selection mechanism that, when selected, explicitly denies the corresponding resource to that user account;
enabling submission of a request to create the user account, the request including an indication of each denial selected; and
sending the request to an access control system to enable a set of permissions associated with a specified role to be obtained and the one or more denials subtracted from the set of permissions to generate a new set of permissions associated with the user account, wherein if the request comprises one or more indications, access to the corresponding one or more resources is denied for that user account.

2. The method according to claim 1, wherein the list of the plurality of resources in the system is displayed in a first user interface after detecting selection of a particular role.

3. The method according to claim 2, wherein only the list of the plurality of resources in the system that the user account has access to are displayed in the first user interface.

4. The method according to claim 1, further comprising:
enabling list of a plurality of resources to be subsequently displayed;
displaying those resources previously selected;
detecting a de-selection of at least one selected resource; and
sending an edit request comprising remaining ones of the previously selected resources.

5. The method according to claim 1, wherein the request is embodied as a hypertext transfer protocol (HTTP) packet.

6. The method according to claim 1, further comprising:
enabling access to the user account; and
displaying one or more administrative details of the user account without displaying any permissions associated with the user account to prevent modification to the permissions.

7. A non-transitory computer readable medium comprising computer executable instructions for providing access control, the computer executable instructions comprising instructions for:
enabling creation of a user account for accessing a system by displaying a list of a plurality of resources in the system that the user account has access to, each resource in the list having associated therewith a selection mechanism that, when selected, explicitly denies the corresponding resource to that user account;
enabling submission of a request to create the user account, the request including an indication of each denial selected; and
sending the request to an access control system to enable a set of permissions associated with a specified role to be obtained and the one or more denials subtracted from the set of permissions to generate a new set of permissions associated with the user account, wherein if the request comprises one or more indications, access to the corresponding one or more resources is denied for that user account.

8. The non-transitory computer readable medium according to claim 7, wherein the list of the plurality of resources in the system is displayed in a first user interface after detecting selection of a particular role.

9. The non-transitory computer readable medium according to claim 8, wherein only the list of the plurality of resources in the system that the user account has access to are displayed in the first user interface.

10. The non-transitory computer readable medium according to claim 7, further comprising instructions for:
    enabling list of a plurality of resources to be subsequently displayed;
    displaying those resources previously selected;
    detecting a de-selection of at least one selected resource; and
    sending an edit request comprising remaining ones of the previously selected resources.

11. The non-transitory computer readable medium according to claim 7, wherein the request is embodied as a hypertext transfer protocol (HTTP) packet.

12. The non-transitory computer readable medium according to claim 7, further comprising instructions for:
    enabling access to the user account; and
    displaying one or more administrative details of the user account without displaying any permissions associated with the user account to prevent modification to the permissions.

13. A method of providing access control, the method comprising:
    receiving, by an access control system, a request to create a new user account, the request including an indication of one or more denials selected for the user account, the one or more denials having been selected from a list of a plurality of resources in a system that the user account has access to, each resource in the list having associated therewith a selection mechanism that, when selected, explicitly denies the corresponding resource to that user account; and
    creating, by the access control system, the user account according to the request by obtaining a set of permissions associated with a specified role and subtracting the one or more denials from the set of permissions to generate a new set of permissions associated with the user account, wherein if the request comprises one or more indications, access to the corresponding one or more resources are denied for that user account.

14. The method according to claim 13, further comprising the access control system determining if any indications are included in the request that are not associated with a particular role; and denying the request if an indication has been added that is not associated with the particular role.

15. The method according to claim 13, further comprising:
    receiving an edit request, the edit request comprising a new set of denials obtained by detecting a de-selection of one or more previously selected denials from a user interface; and
    subtracting the new set of denials from a set of permissions associated with a specified role, to generate a new set of permissions associated with the user account.

16. An access control system comprising:
    a processor and memory, the memory comprising computer executable instructions for providing access control, the computer executable instructions comprising instructions for:
    receiving a request to create a new user account, the request including an indication of one or more denials selected for the user account, the one or more denials having been selected from a list of a plurality of resources in the system that the user account has access to, each resource in the list having associated therewith a selection mechanism that, when selected, explicitly denies the corresponding resource to that user account; and
    creating the user account according to the request by obtaining a set of permissions associated with a specified role and subtracting the one or more denials from the set of permissions to generate a new set of permissions associated with the user account, wherein if the request comprises one or more indications, access to the corresponding one or more resources are denied for that user account.

17. The access control system according to claim 16, further comprising instructions for determining if any indications are included in the request that are not associated with a particular role; and denying the request if an indication has been added that is not associated with the particular role.

18. The access control system according to claim 16, further comprising instructions for:
    receiving an edit request, the edit request comprising a new set of denials obtained by detecting a de-selection of one or more previously selected denials from a first user interface; and
    subtracting the new set of denials from a set of permissions associated with a specified role, to generate a new set of permissions associated with the user account.

* * * * *